(12) United States Patent
Papamoschou (10) Patent No.: US 7,293,401 B2
(45) Date of Patent: Nov. 13, 2007

(54) JET ENGINE NOISE SUPPRESSOR

(75) Inventor: Dimitri Papamoschou, Mission Viejo, CA (US)

(73) Assignee: The Regents of the University of California, Oakland, CA (US)

( * ) Notice: Subject to any disclaimer, the term of this patent is extended or adjusted under 35 U.S.C. 154(b) by 21 days.

(21) Appl. No.: 10/393,173

(22) Filed: Mar. 20, 2003

(65) Prior Publication Data

US 2004/0031258 A1   Feb. 19, 2004

Related U.S. Application Data

(60) Provisional application No. 60/366,379, filed on Mar. 20, 2002.

(51) Int. Cl.
*F02K 3/02* (2006.01)
*F02K 1/34* (2006.01)
*F02K 1/40* (2006.01)

(52) U.S. Cl. .................. 60/226.1; 60/262; 60/230; 60/231; 181/213; 181/220; 239/265.17; 239/265.35

(58) Field of Classification Search .................. 60/262, 60/264, 226.1, 230, 231, 232; 239/265.17, 239/265.19, 265.35; 181/213, 220
See application file for complete search history.

(56) References Cited

U.S. PATENT DOCUMENTS

| | | | | |
|---|---|---|---|---|
| 2,931,171 A | * | 4/1960 | Tyler et al. | 239/265.17 |
| 2,934,889 A | * | 5/1960 | Poulos | 239/265.11 |
| 2,944,623 A | * | 7/1960 | Bodine, Jr. | 181/213 |
| 2,986,002 A | * | 5/1961 | Ferri | 181/213 |
| 3,020,714 A | * | 2/1962 | Eggers et al. | 239/265.19 |
| 3,153,319 A | * | 10/1964 | Young et al. | 239/265.19 |
| 3,161,257 A | * | 12/1964 | Young | 181/219 |
| 3,393,518 A | | 7/1968 | Bridge | |
| 3,463,402 A | * | 8/1969 | Langston, Jr. | 239/265.13 |
| 3,583,640 A | | 6/1971 | MacDonald | |
| 3,598,318 A | | 8/1971 | Schiel | |
| 3,599,749 A | * | 8/1971 | Millman | 181/220 |
| 3,613,827 A | * | 10/1971 | Labussiere | 181/215 |
| 3,618,701 A | | 11/1971 | Macdonald | |
| 3,621,933 A | * | 11/1971 | Raynes | 239/265.33 |
| 3,648,800 A | * | 3/1972 | Hoerst | 181/213 |
| 3,664,455 A | * | 5/1972 | Duvvuri | 181/215 |
| 3,780,827 A | | 12/1973 | Straight | |
| 3,982,696 A | | 9/1976 | Gordon | |
| 4,280,587 A | | 7/1981 | Bhat | |
| 4,284,170 A | * | 8/1981 | Larson et al. | 239/265.19 |
| 4,298,089 A | * | 11/1981 | Birch et al. | 181/213 |
| 4,311,291 A | * | 1/1982 | Gilbertson et al. | 239/265.19 |
| 4,422,524 A | * | 12/1983 | Osborn | 239/265.39 |
| 4,625,828 A | * | 12/1986 | Shivashankara et al. | 181/175 |
| 4,934,481 A | * | 6/1990 | Friedrich | 181/220 |
| 5,092,425 A | * | 3/1992 | Shaw, Jr. | 181/213 |

(Continued)

*Primary Examiner*—Ted Kim
(74) *Attorney, Agent, or Firm*—Blakely, Sokoloff, Taylor & Zafman (57) ABSTRACT

An embodiment of the invention is a technique to suppress noise in a jet engine. A noise suppressor includes an exhaust duct to exhaust a first stream from an air stream taken from an inlet. The exhaust duct has an exit end. The air stream is divided into the first stream and a second stream. The second stream has an axis. A stream director attached to vicinity of the exit end directs the first stream to a direction that is away from or sideward relative to the axis.

35 Claims, 11 Drawing Sheets

U.S. PATENT DOCUMENTS

| | | | |
|---|---|---|---|
| 5,386,689 A * | 2/1995 | Bozich et al. | 60/803 |
| 5,428,954 A | 7/1995 | Cowan, Sr. | |
| 5,755,092 A * | 5/1998 | Dessale et al. | 60/262 |
| 5,758,488 A | 6/1998 | Batey | |
| 5,771,681 A * | 6/1998 | Rudolph | 60/262 |
| 5,947,412 A | 9/1999 | Berman | |
| 6,415,598 B2 * | 7/2002 | Pinker | 60/226.1 |
| 6,427,801 B1 | 8/2002 | Dugan | |
| 6,487,848 B2 | 12/2002 | Zysman et al. | |
| 6,502,383 B1 * | 1/2003 | Janardan et al. | 60/226.1 |
| 6,571,549 B1 | 6/2003 | Stanek | |
| 6,983,588 B2 * | 1/2006 | Lair | 60/226.1 |

* cited by examiner

FIG. 11

JET ENGINE NOISE SUPPRESSOR

This patent application claims the benefit of U.S. Provisional Application No. 60/366,379 filed on Mar. 20, 2002.

This invention was made with Government support under Grant No. NAG-3-2345, awarded by the National Aeronautics & Space Administration. The Government has certain rights in this invention.

BACKGROUND

1. Field of the Invention

Embodiments of the invention relate to jet engines, and more specifically, to jet engine noise suppression.

2. Description of Related Art

Aircraft noise has been a major problem in the aircraft industry. Among the sources of aircraft noise, jet engine noise is a dominant source. For commercial aircraft, the noise level becomes significant during both take-off and landing, causing concerns to local communities near airports.

Current techniques to suppress jet engine noise have a number of drawbacks. Techniques relying on corrugated or fluted exhaust nozzles or additional passages connected to exhaust gas flow can only reduce some amount of noise at the expense of thrust loss and base drag increase. Other techniques do not provide satisfactory results or are not flexible to accommodate different engine operational modes in a typical aircraft flight route.

SUMMARY OF THE INVENTION

An embodiment of the invention is a technique to suppress noise in a jet engine. A noise suppressor includes an exhaust duct to exhaust a first stream from an air stream taken from an inlet. The exhaust duct has an exit end. The air stream is divided into the first stream and a second stream. The second stream has an axis. A stream director attached to vicinity of the exit end directs the first stream to a direction that is away from or sideward relative to the axis.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the invention is a technique to suppress noise in a jet engine. A noise suppressor includes an exhaust duct to exhaust a first stream from an air stream taken from an inlet. The exhaust duct has an exit end. The air stream is divided into the first stream and a second stream. The second stream has an axis. A stream director attached to a vicinity of the exit end directs the first stream to a direction that is away from or sideward relative to the axis.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
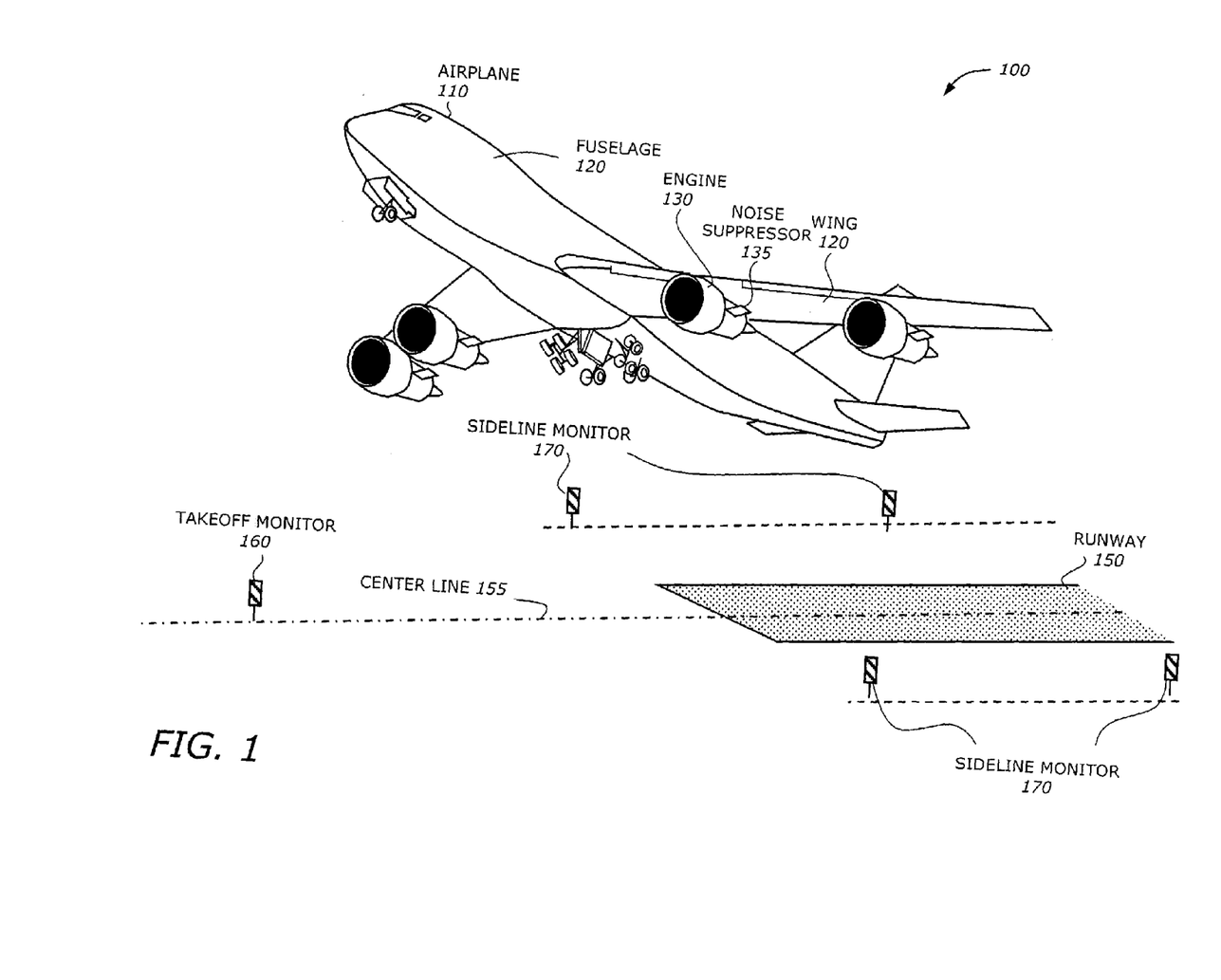
FIG. 1 is a diagram illustrating a system in which one embodiment of the invention can be practiced.

FIG. 1 is a diagram illustrating a system 100 in which one embodiment of the invention can be practiced. The system 100 depicts a typical scenario of an airplane taking off or landing at an airport. The system 100 includes an aircraft 110 and a runway 150. Note that the system 100 may include more or less components as shown.

The aircraft 110 is any aircraft that uses jet engines. It may be a commercial passenger or cargo aircraft used by airlines, military aircraft, corporate aircraft, or private aircraft for personal uses. The aircraft 110 includes a fuselage 120, wings 122 and engines $130_1$ to $130_4$. As is known by one skilled in the art, the aircraft may have any other configurations. The jet engines $130_1$ to $130_4$ are mounted under the wings 122. In other configurations, the engines could be mounted on the rear of the fuselage or over the wing. In one embodiment, the engines are turbofan engines. Each of the jet engines $130_1$ to $130_4$ has a noise suppressor 135 that suppresses noise continuously or during periods when the generated noise has the most environmental effects, such as takeoff and landing.

The runway 150 is any suitable runway for the aircraft 110 for take-off and landing. The runway has sets of acoustic sensors (e.g., microphones) to sense the noise generated by the aircraft 110 during take-off and landing. For the takeoff phase, the sets of acoustic sensors include a take-off monitor 160 and a series or sideline monitors 170. The takeoff monitor 160 is installed on an extended centerline 155 of the runaway 150 at g prescribed distance from the start of the runway 150. The sideline monitors 170 are installed at sidelines of the runway 120 such as on lines that are parallel to the centerline 155 of the runway 150 and at prescribed distance from the centerline 155. The take-off and sideline monitors 160 and 170 have instrument and communication equipment to transmit signals to the aircraft or to a monitor center, The transmit signals provide noise information as generated by the aircraft 110. The noise suppressor 135 on the aircraft 110 receives this signal and other sensing signals or data such as aircraft position and attitude, and activates or deactivates the noise suppression accordingly. A similar arrangement would be used for reducing noise during the landing phase.

Figure 2:
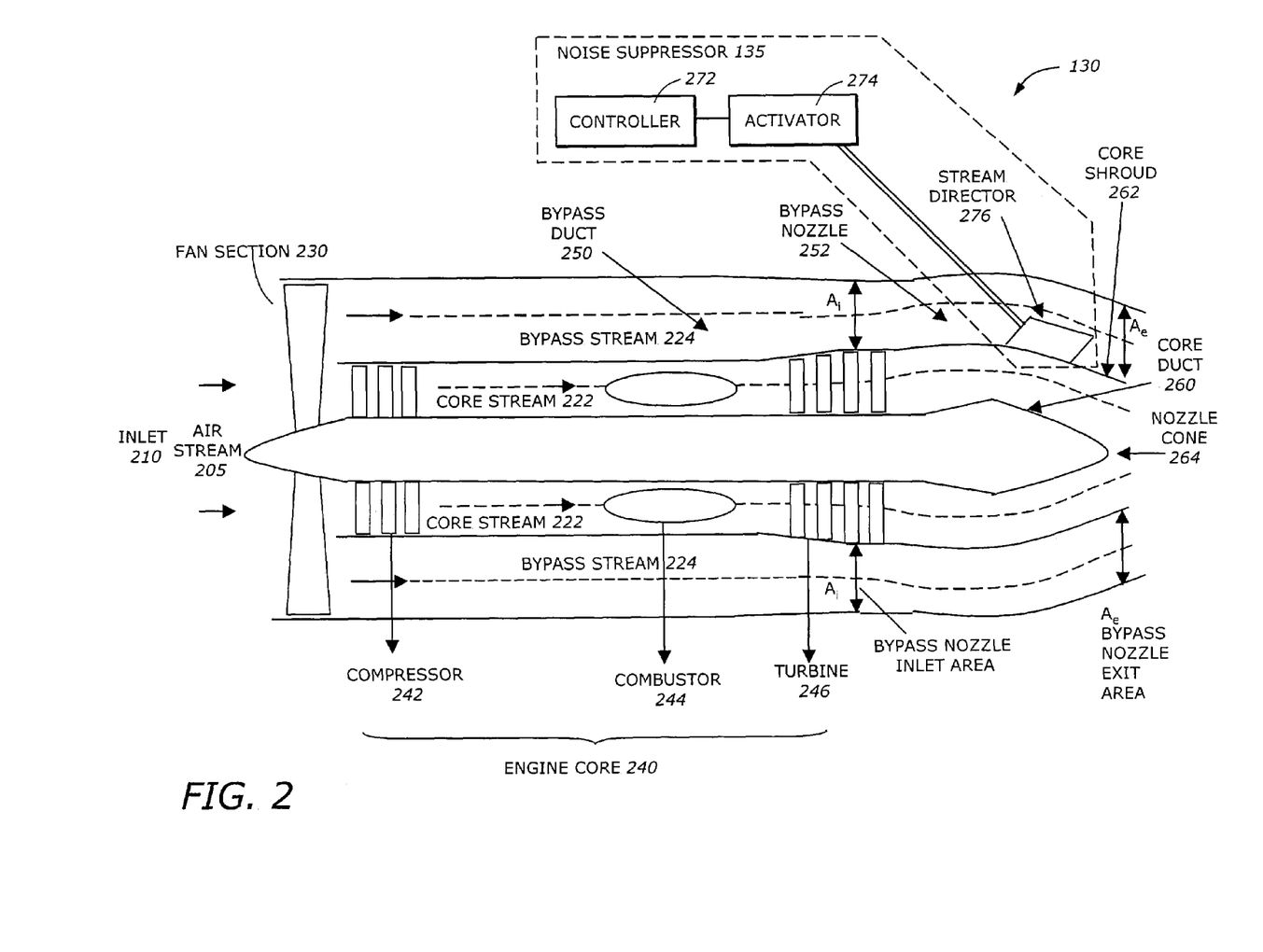
FIG. 2 is a diagram illustrating a turbofan engine according to one embodiment of the invention.

FIG. 2 is a diagram illustrating a jet engine 130 according to one embodiment of the invention. The jet engine 130 may be any suitable jet engine used in the aircraft 110. The jet engine shown in FIG. 2 is a turbofan engine. The jet engine 130 includes a fan section 230, an engine core 240, a bypass duct 250, a core duct 260, and the noise suppressor 135.

The fan section 230 includes a fan to accelerate an air stream 205 from an inlet 210. The air stream 205 is divided into a core stream 222 and a bypass stream 224. The core stream 222 goes through the engine core 240 and is exhausted to the back of the jet engine 130 into the core duct 260. The bypass stream 224 bypasses the engine core 240 and is exhausted to the back of the jet engine 130 through a bypass nozzle 252 in the bypass duct 250. The engine core 240 includes a compressor 242, a combustor 244, and a turbine 246. The operations of these components are well known in the art and therefore are not further described.

The bypass duct 250 has a nozzle 252 with an inlet area $A_i$ and an exit area $A_e$ at the exit of the jet engine 130. In a typical turbofan engine, the inlet area is approximately equal to or greater than the exit area. The core duct 260 is defined by the core shroud 262 and a nozzle cone 264. Typically the bypass stream 224 exhausts through the bypass nozzle 252 at a slow speed and the core stream 222 exhausts through the core duct 260 at a high speed.

The noise suppressor 135 includes a controller 272, an activator 274, and a stream director 276. The controller 272 may be located on the engine or at a distance from the engine 130 such as in the frame of the wing or any other suitable location. The controller 272 receives control signals either from the flight crew (e.g., pilot, flight engineer), from a prescribed control sequence, or from an automatic sensing instrument. The controller 272 generates control signals to the activator 274 to activate or deactivate the stream director 276. The activator 274 activates or deactivates the stream director 276 under the control of the controller 272. The activator 274 may be a hydraulic, electrical, or mechanical actuator or a valve that controls the movement of the stream director into two positions: a retracted position and an extended position. The retracted position corresponds to a deactivated condition or to the position of the stream director that provides no noise suppression. The extended position corresponds an activated condition or to the position of the stream director that provides noise suppression. Intermediate positions may be defined to allow a gradual movement of the stream director 276. The stream director 276 is located at the bypass nozzle 252 or the core duct 260 to direct the bypass stream 224 or the core stream 222, respectively, such that the jet noise is suppressed. The stream director 276 may be a vane, a strake, or a fluid injector. When the stream director 276 is a fluid injector, the term retracted position corresponds to a closed position where the fluid injector stops or reduces injecting the fluid, and the term extended position corresponds to an open position where the fluid injector injects or increases injecting the fluid.

The noise suppressor 135 may operate in a fixed mode or a variable mode. In the fixed mode, the position and/or the orientation of the stream director 276 is fixed according to some optimal criteria. In this mode, the controller 272 and/or the activator 274 may not be needed. In the variable mode, the position and/or the orientation of the stream director 276 is variable or changed, either manually or automatically, according to the desired level of noise suppression. The controller 272 and the activator 274 are used to control the movement of the stream director 276.

Figure 3:
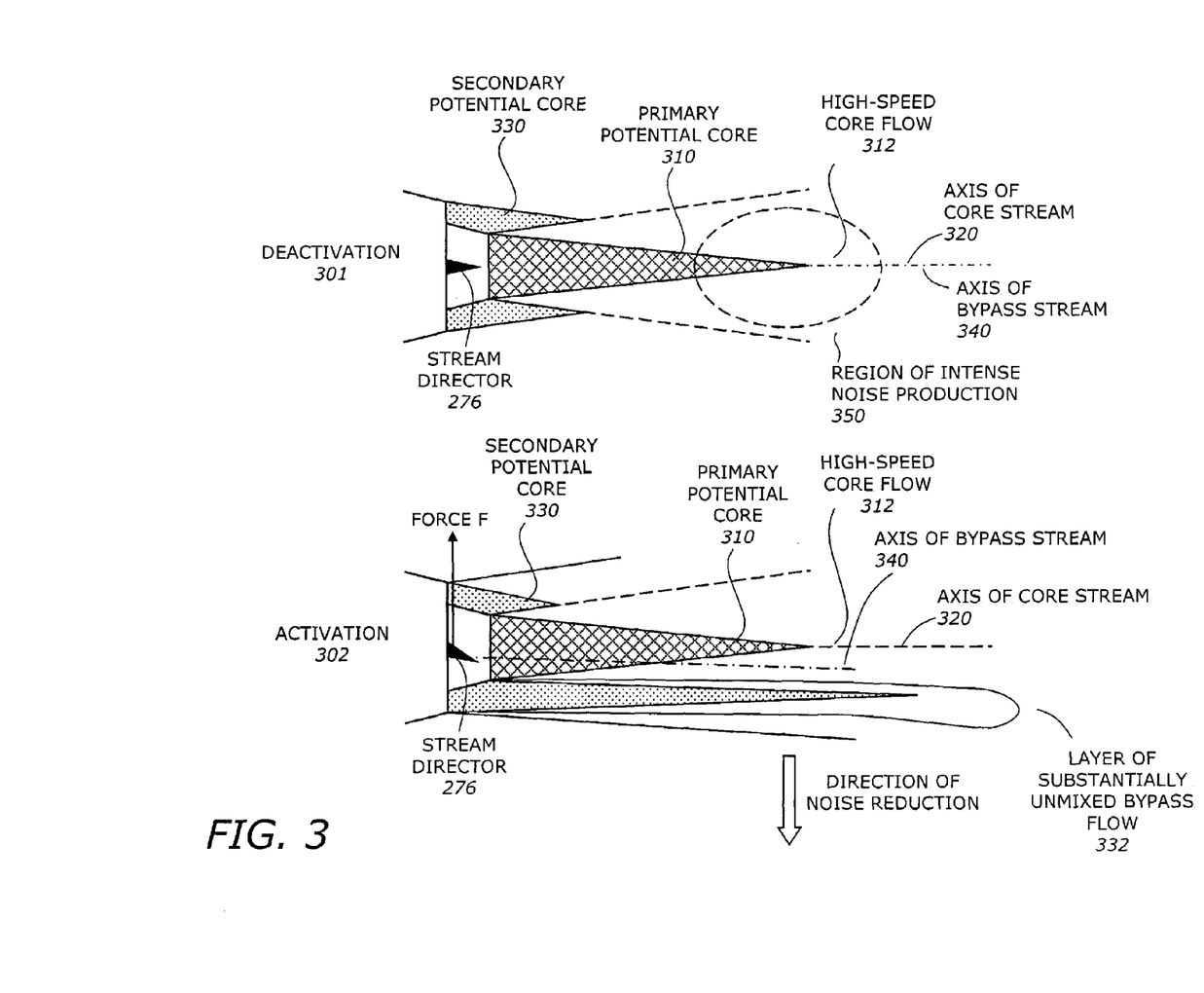
FIG. 3 is a diagram illustrating a basic principle of noise suppression according to one embodiment of the invention.

FIG. 3 is a diagram illustrating a basic principle of noise suppression according to one embodiment of the invention. The principle of noise suppression can be explained from a deactivation condition 301 and an activation condition 302.

The principle of noise suppression or reduction is based on a directional noise reduction method. In other words, noise is suppressed when the direction of the bypass stream 224 or the core stream 222 is altered such that the slower bypass stream 224 is concentrated or forced under the faster core stream 222 in the region where intense noise is generated or emitted. In a typical jet exhaust configuration at the exit of the jet engine, the core stream 222 is a fast stream which forms a primary potential core 310 around an axis of primary core 320, typically aligned with the center line of the engine core. The region around the end of the primary potential core 310 is a region of intense noise production 350. In this region, high-speed core flow 312 is very turbulent and jet noise emission is the most significant. The bypass stream 224 is typically slower than the core stream 222 and forms a secondary potential core 330 around the start of the primary potential core 310. The secondary potential core 330 has an axis of bypass stream 340. The stream director 276 is positioned at a location in the vicinity of the exit of the bypass nozzle 252 and is substantially immersed in the bypass stream 224 exiting the bypass nozzle 252.

In the deactivated mode 301, the stream director 276 is at the retracted position where it is substantially aligned with the axis of the core stream 320 and with the axis of the bypass stream 340. In this condition, the primary potential core 310 and the secondary potential core 330 are substantially coaxial. In this configuration, the secondary potential core 330 ends well upstream of the end of the primary potential core 310 resulting in little or no noise suppression. In situations where the bypass nozzle and the core duct are offset, the axis of the core stream is parallel with the axis of the bypass stream.

In the activation mode 302, the stream director 276 is at the extended position where it is deflected at an angle causing the axis of the bypass stream 340 to be deflected from the axis of the core stream 320. The deflection is downward where the noise suppression is most desired because the aircraft is above the ground. Due to this deflection and associated change in the downward momentum of the bypass stream, a force F is generated on the stream director 276. This force F induces a downward motion or the bypass flow so that the lower portion of the secondary potential core is elongated. Moreover, the downward induction of bypass flow results in a layer of substantially unmixed bypass flow 332 around and downstream of the lower portion of the primary potential core. The result is that a layer of potential or substantially unmixed bypass flow 332 covers the region of intense noise production 350. In the vicinity of the region of intense noise production 350, the high-speed core flow 312 and the layer of substantially unmixed bypass flow 332 form an eccentric configuration. This eccentric configuration causes noise suppression at the downward and sideward directions. The eccentricity of the high-speed core flow and substantially unmixed bypass flow depends on the on the angle of deflection of the axis of the bypass stream 340 relative to the axis of the core stream 320. Since the activation of the stream director 276 creates the force F that produces this deflection, the stream director 276 may be referred to as a force generator.

The same principle can be applied to the core flow. Eccentricity between the high-speed core flow and the substantially unmixed bypass flow can be achieved by deflecting the secondary potential core 330 downward or deflecting the primary potential core 310 upward. To do this, the stream director 276 is placed in the vicinity of the exit of the core duct 260 and actuated such that the core stream 222 is deflected upward relative to the axis of the bypass stream 340. The result is that the lower layer of the secondary potential core 330 is elongated below the primary potential core 310 and that a long layer of substantially unmixed bypass flow 332 forms under the high-speed core flow 312. The percentage of the substantially unmixed gas in the substantially unmixed bypass flow 332 may be above 60%

Figure 4:
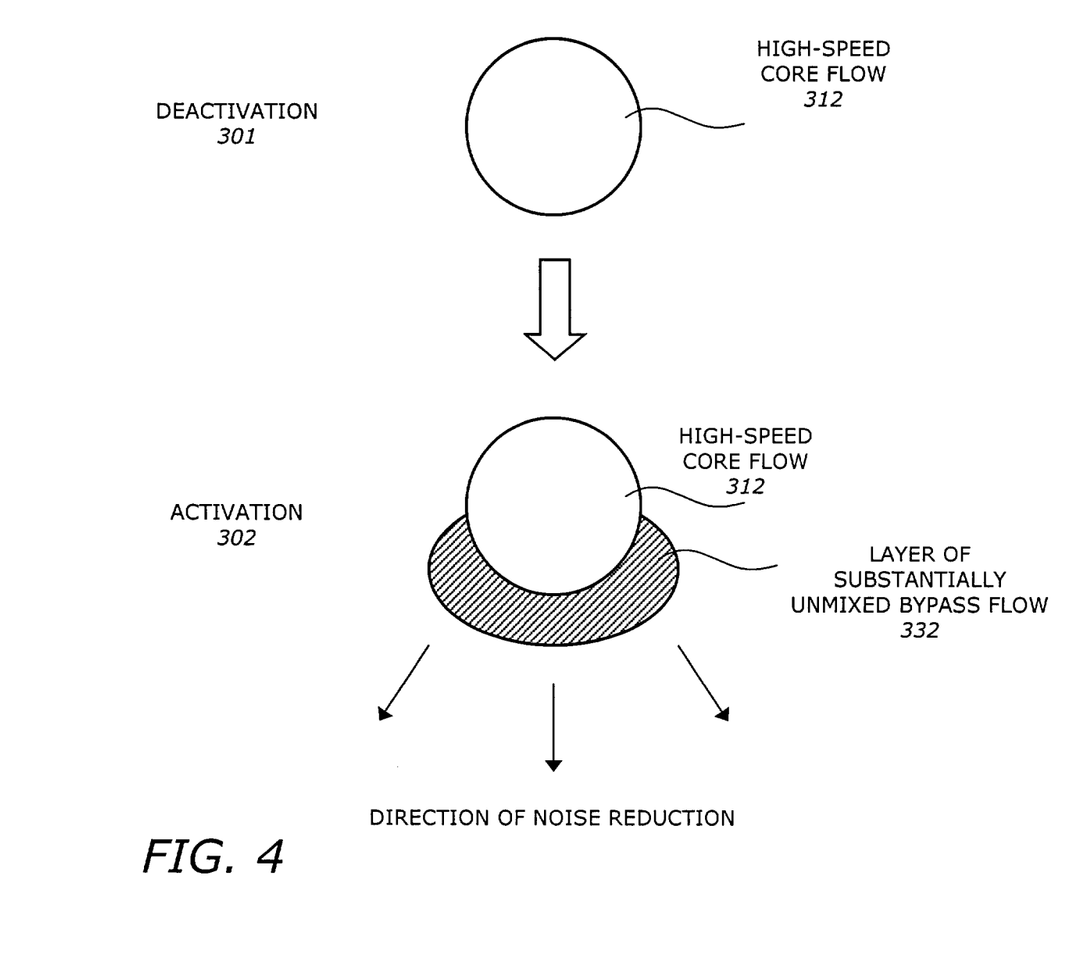
FIG. 4 is a diagram illustrating a phenomenon at the region of intension noise emission according to one embodiment of the invention.

FIG. 4 is a diagram illustrating a phenomenon at the region of intension noise emission according to one embodiment of the invention. The phenomenon exists in two modes, the deactivated mode 301 and the activated mode 302 as shown in FIG. 3.

In the deactivated mode 301, the end of the primary core 310 is dominated by the high-speed core flow 312. In this configuration, the gas of the bypass stream 224 is substantially or completely mixed before reaching this region. Therefore, there is little or no noise suppression.

In the activated mode 302, the lower end of the high-speed core flow 312 is surrounded by a layer of the slower gas from the substantially unmixed bypass flow 332. Since the stream director 276 induces a downward or sideward motion of the bypass stream relative to the core stream, this layer is concentrated in the downward or sideward directions to suppress noise in those directions.

Noise suppression therefore can be achieved based on the above principle. In essence, this is achieved by one of the following techniques. In the first technique, the bypass stream 224 is directed downward and/or sideward relative to the axis of the core stream exhaust. In the second technique, the core stream 222 is directed upward and/or sideward relative to the axis of the bypass stream exhaust. In the third technique, a combination of the first and second techniques is used.

Figure 5:
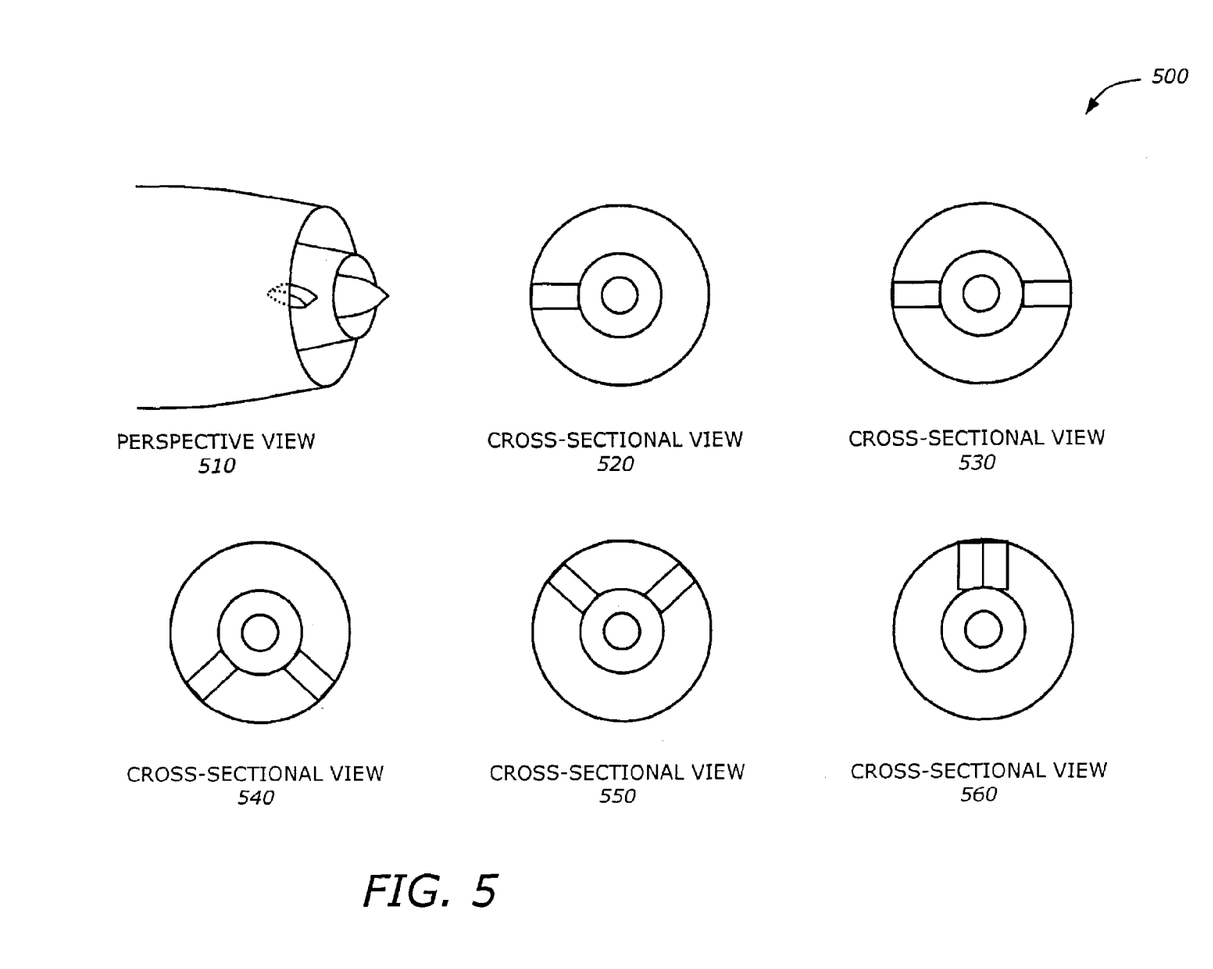
FIG. 5 is a diagram illustrating noise suppression using a stream director at the bypass duct according to one embodiment of the invention.

FIG. 5 is a diagram illustrating a configuration 500 for noise suppression using a stream director at the bypass duct according to one embodiment of the invention. The configuration 500 is shown in a perspective view 510 and cross-sectional views 520, 530, 540, 550, and 560.

As shown in the perspective view 510, the stream director 276 is placed at or attached to the vicinity of the exit end of the bypass duct 250 to direct the bypass stream to a direction that is away from or downward, or opposite, or sideward relative to the axis of the core stream 320. The cross-sectional views 520 to 560 show various arrangements of the stream director 276 around the bypass nozzle 252. The stream director 276 may be a vane, a strake, or a fluid injector. View 520 shows a single vane, strake, or fluid injector located on one side of the bypass nozzle 252. View 530 shows two vanes, or two strakes, or two fluid injectors, or any combination therein, located horizontally on opposite sides of the bypass nozzle 252. View 540 shows two vanes, or two strakes, or two fluid injectors, or any combination therein, located on opposite sides of the bypass nozzle 252 with downward deflection angles. View 550 shows two vanes, or two strakes, or two fluid injectors, or any combination therein, located on opposite sides of the bypass nozzle 252 with upward deflection angles. View 560 shows two vanes, or two strakes, or two fluid injectors, or any combination therein, located on opposite sides of the bypass nozzle 252 with right deflection angles. It is also noted that the stream director 276 may include any number of vanes, strakes, and fluid injectors. The stream director 276 may be placed inside, outside, or partly inside and partly outside of the bypass nozzle 252. The span of the stream director may be smaller, greater, or equal to the span of the bypass flow it deflects.

Figure 6:
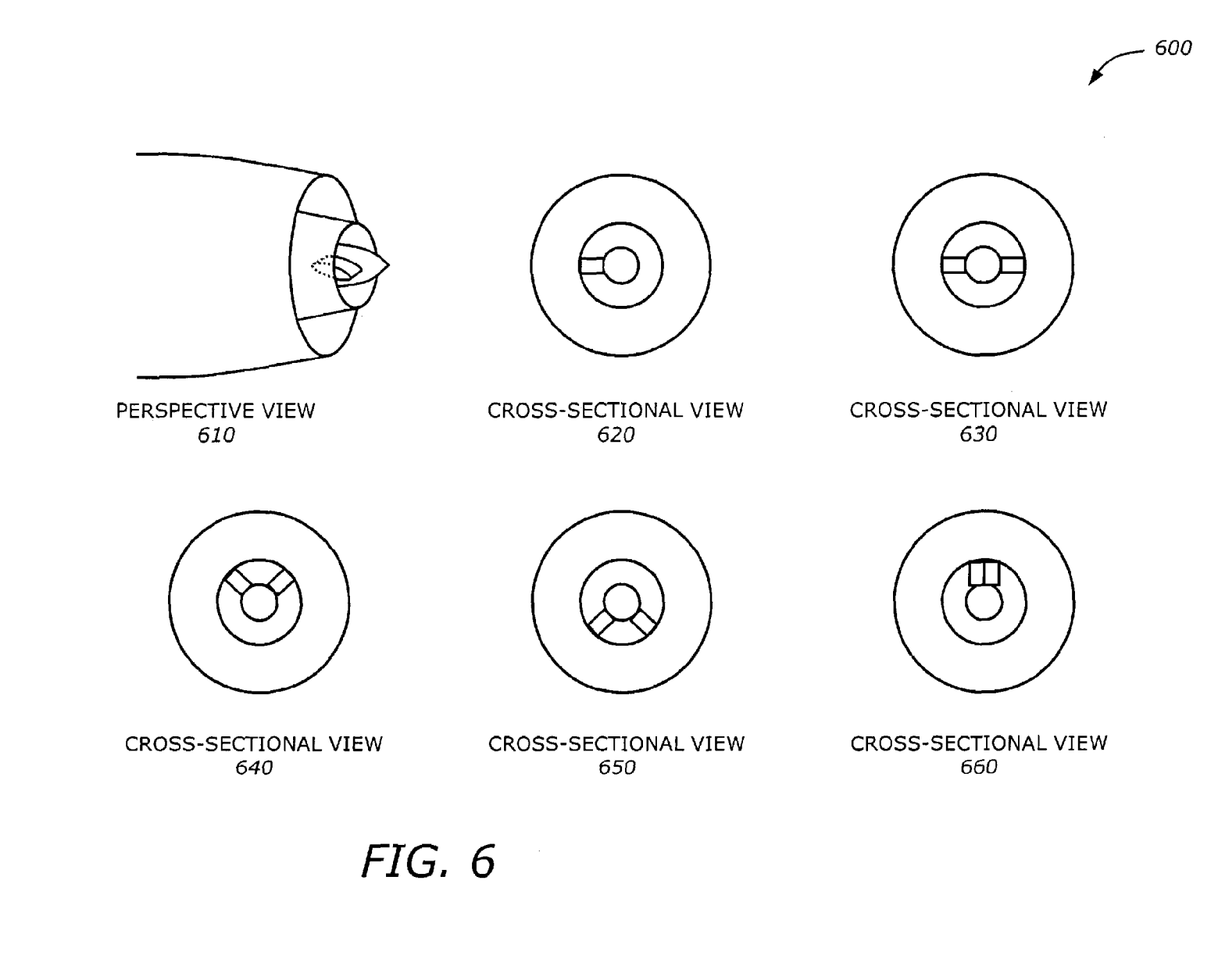
FIG. 6 is a diagram illustrating noise suppression using a stream director at the core duct according to one embodiment of the invention.

FIG. 6 is a diagram illustrating a configuration 600 for noise suppression using a stream director at the core duct according to one embodiment of the invention. The configuration 600 is shown in a perspective view 610 and cross-sectional views 620, 630, 640, 650, and 660.

Figure 7:
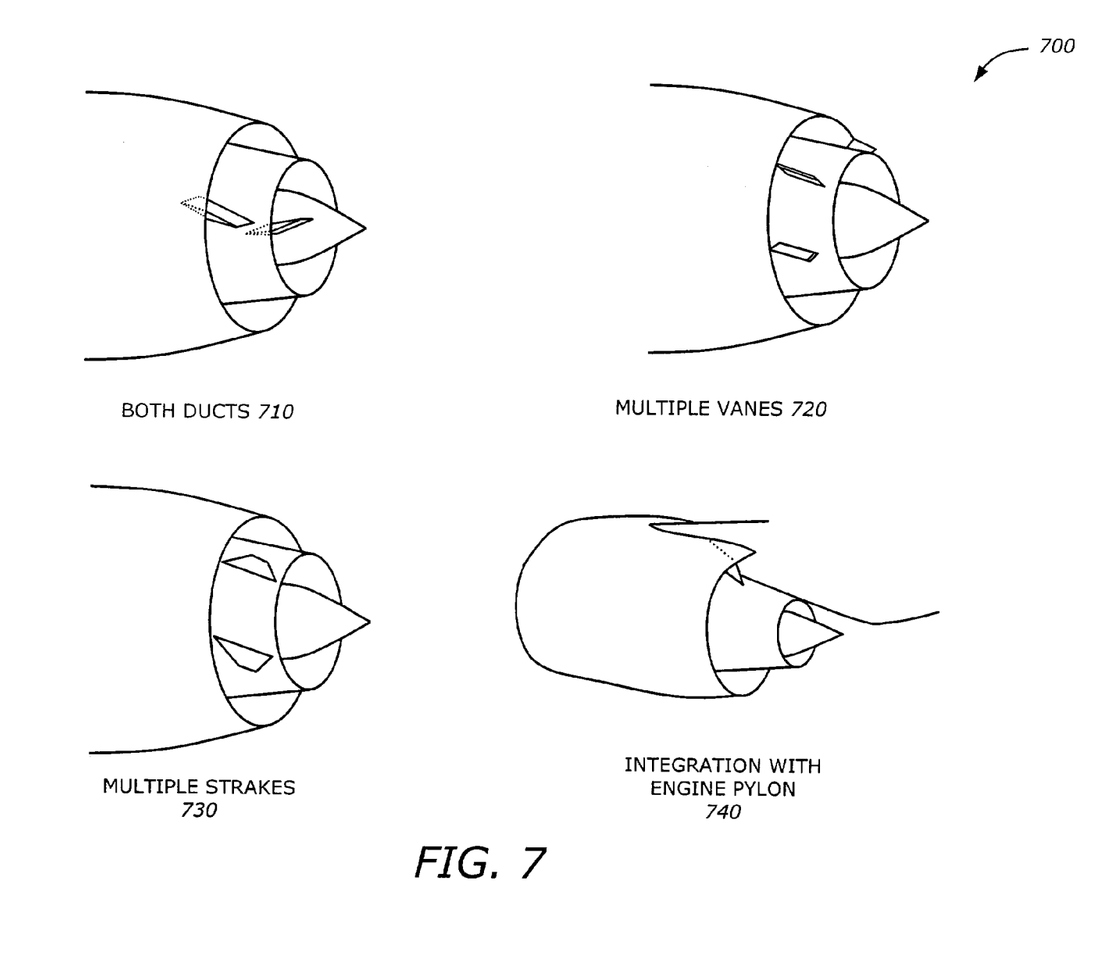
FIG. 7 is a diagram illustrating noise suppression using other configurations of the stream director according to one embodiment of the invention.

As shown in the perspective view 610, the stream director 276 is placed at or attached to the vicinity of the exit end of the core duct 260 to direct the core stream to a direction that is away from or upward, or opposite or sideward relative to the axis of the bypass stream 340. The cross-sectional views 620 to 660 show various arrangements of the stream director 276 around the core duct 260. The stream director 276 may be a vane, a strake, or a fluid injector. The view 620 shows a single vane, strake, or fluid injector located on one side of the core duct 260. View 630 shows two vanes, or two strakes, or two fluid injectors, or any combination therein, located horizontally on opposite sides of the core duct 260. View 640 shows two vanes, or two strakes, or two fluid injectors, or any combination therein, located on opposite sides of the core duct 260 with upward deflection angles. View 650 shows two vanes, or two strakes, or two fluid injectors, or any combination therein, located on opposite sides of the core duct 260 with downward deflection angles. View 660 shows two vanes, or two strakes, or two fluid injectors, or any combination therein, located on opposite sides of the core duct 260 with right deflection angles. It is also noted that the stream director 276 may include any number of vanes, strakes, and fluid injectors. The stream director 276 may be placed inside, outside, or partly inside and partly outside of the core duct 260. The span of the stream director may be smaller, greater, or equal to the span of the core flow it deflects FIG. 7 is a diagram illustrating noise suppression using other configurations 700 of the stream director according to one embodiment of the invention. The other configurations 700 include configurations 710, 720, 730, and 740.

The configuration 710 shows the stream director located in both the bypass stream 250 and the core stream 260. In each duct, the stream director 276 may have any of the configurations as shown in FIGS. 5 and 6.

The configuration 720 shows multiple vanes located in the bypass duct 250 or core duct 260. The number of vanes may be any suitable number and the arrangement may be any arrangement that may create an eccentricity between the high-speed core flow 312 and the substantially unmixed bypass flow 332. The configuration 730 is the same as 720 except that strakes are used instead of vanes.

The configuration 740 shows integration of vanes with the engine pylon. This configuration is suitable for bypass nozzle 252. This configuration may be standalone or combined with any of the above configurations.

Figure 8:
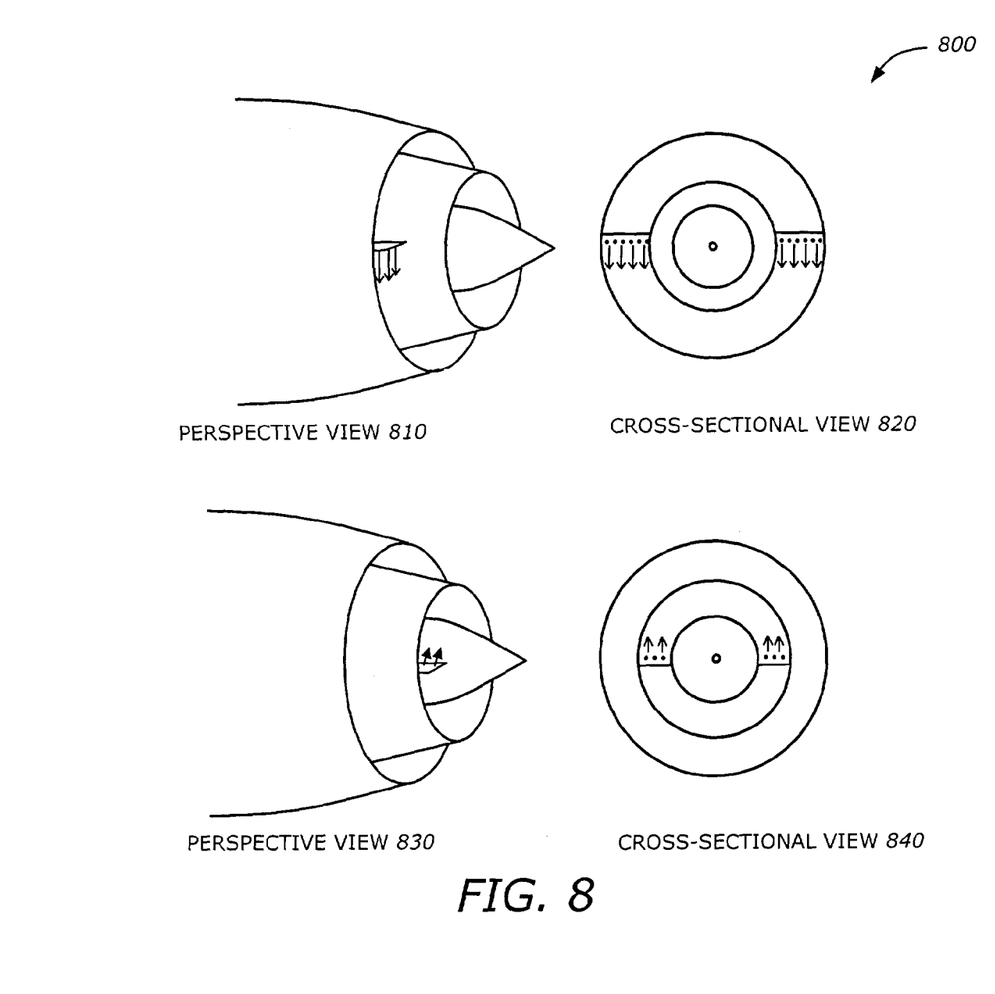
FIG. 8 is a diagram illustrating noise suppression using a fluid injector according to one embodiment of the invention.

FIG. 8 is a diagram illustrating a configuration 800 for noise suppression using a fluid injector according to one embodiment of the invention. The configuration 800 includes perspective views 810 and cross-sectional views 820 and 840.

In this configuration, the stream director 276 is a fluid injector. The fluid of the fluid injector may come from the engine compressor (air) or from compressed fluids stored onboard in the aircraft. The fluid may be gaseous (e.g., air) or liquid (e.g., water). The injection may be controlled by pressure regulators and by on/off valve as implemented by the activator 274 and the controller 272 (FIG. 2). The typical injection mass flow rate may be a small fraction (e.g., in the order of 5% or less) of the mass flow rate of the air flowing through the engine compressor. The fluid injector injects the fluid at an angle to the stream. The angle may be a right angle or an oblique angle.

The perspective view 810 shows the fluid injector located at the bypass duct 250. The fluid injector 276 may be positioned such that the fluid is injected downward and/or sideward relative to the axis of the core stream, or at an angle to the core stream. The cross-sectional view 820 shows the cross-sectional views of the fluid injector 276 in the bypass duct as seen from the back of the engine. The perspective view 830 shows the fluid injector located at the core duct 260. The fluid injector 276 may be positioned such that the fluid is injected upward and/or sideward relative to the axis of the bypass stream. The cross-sectional view 840 shows the cross-sectional views of the fluid injector 276 in the core duct as seen from the back of the engine.

Figure 9:
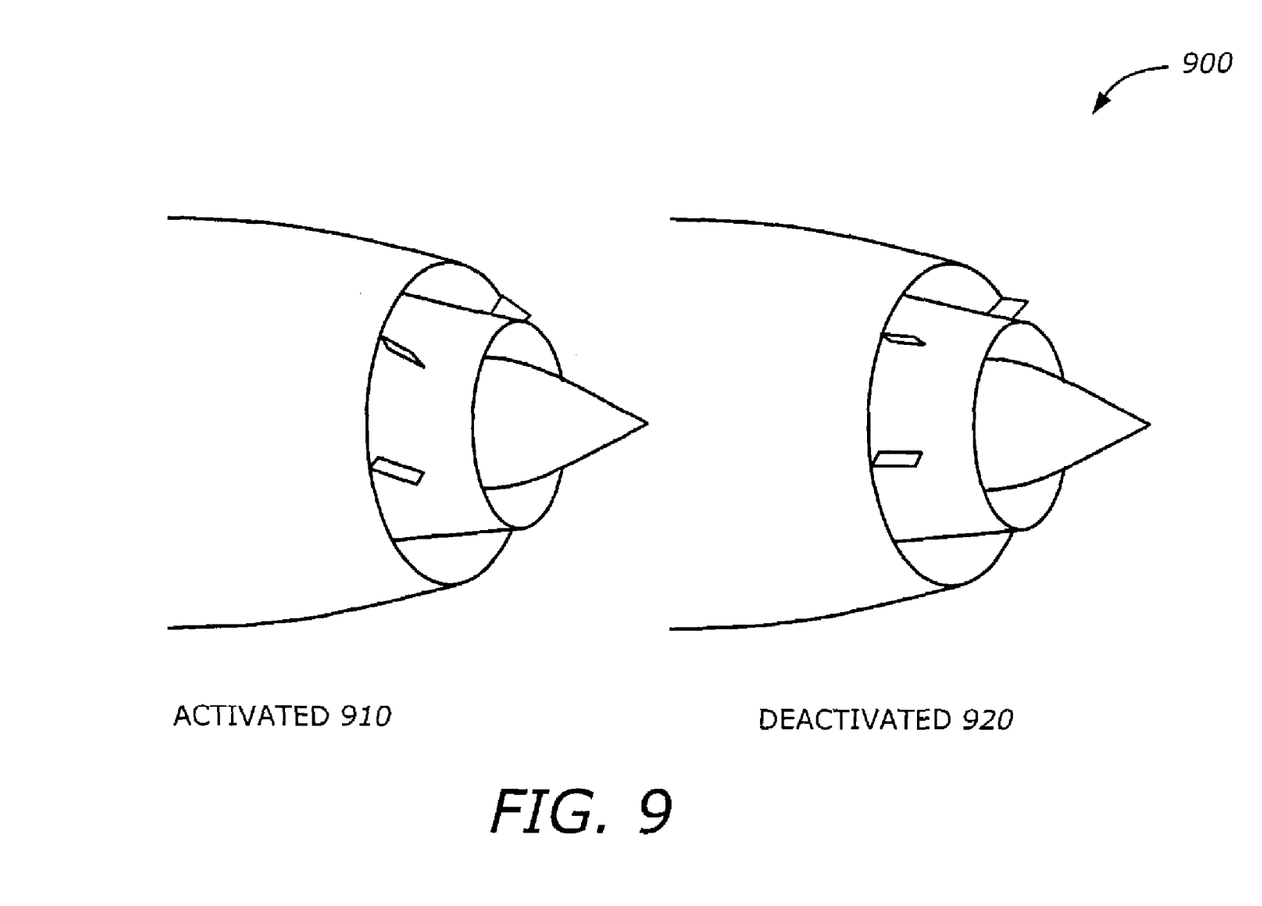
FIG. 9 is a diagram illustrating a first mechanism for activation/deactivation of stream director according to one embodiment of the invention.

FIG. 9 is a diagram illustrating a first mechanism 900 for activation/deactivation of stream director according to one embodiment of the invention. The first mechanism includes an activated mode 910 and an deactivated mode 920.

In the activated mode 910, the stream director 276 is deflected with an angle when noise reduction is desired. In the deactivated mode 920, the stream director 276 is aligned with the flow direction or the axis of the core stream.

Figure 10:
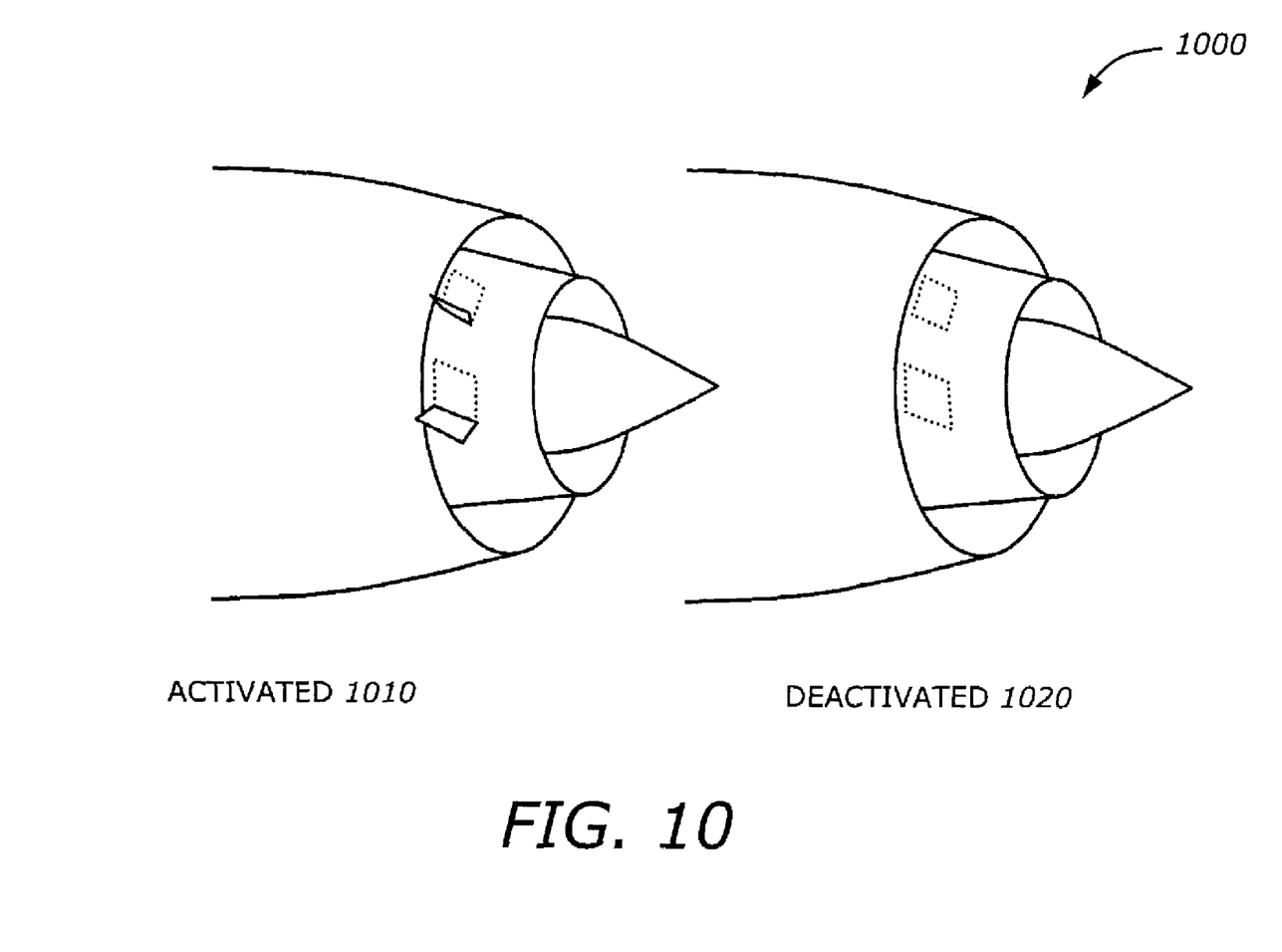
FIG. 10 is a diagram illustrating a second mechanism for activation/deactivation of stream director according to one embodiment of the invention.

FIG. 10 is a diagram illustrating a second mechanism 1000 for activation/deactivation of stream director according to one embodiment of the invention. The first mechanism includes an activated mode 1010 and a deactivated mode 1020.

In the activated mode 1010, the stream director 276 is deployed outward in an azimuthal motion when noise reduction is desired. In the deactivated mode 1020, the stream director 276 is stowed flush with the core shroud 262 (FIG. 2). Note that the stream director 276 may include a single vane or strake or multiple vanes or strakes.

Figure 11:
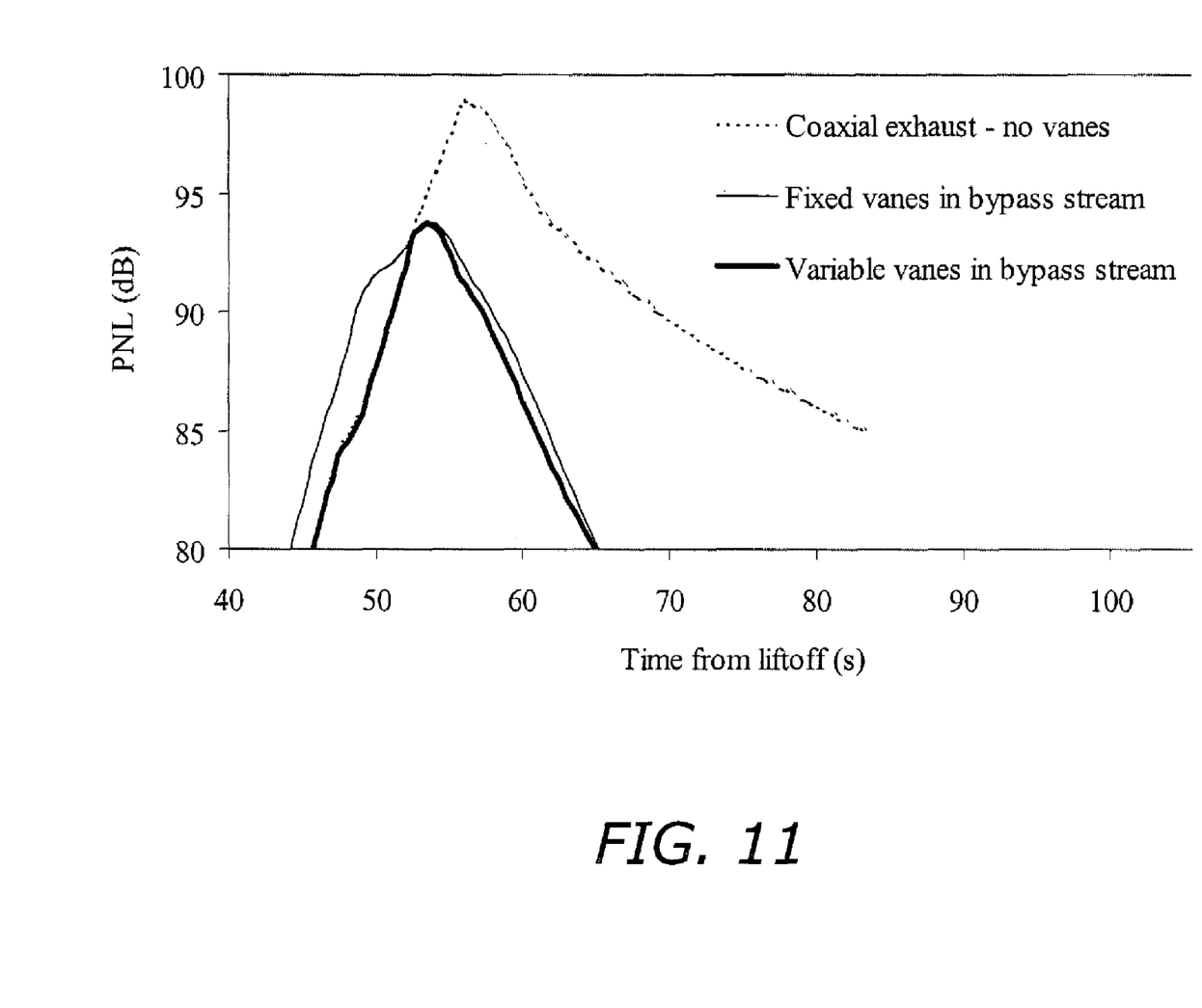
FIG. 11 is a diagram illustrating flyover noise predictions according to one embodiment of the invention.

FIG. 11 is a diagram illustrating flyover noise predictions according to one embodiment of the invention.

The flyover noise predictions are obtained based on experiments simulating the exhaust conditions of an engine similar to the Pratt & Whitney JT8D-217. In these experiments, the stream director 276 including multiple vanes is installed in the bypass duct 250. The perceived noise level (PNL) versus time for an observer situated at the standard take-off monitor position is shown. In terms of effective perceived noise level EPNL, vanes oriented at fixed angle reduce the EPNL by 5.0 dB. Various vanes, deflected on an optimal time schedule, reduce the EPNL by 6.3 dB.

On a separate flow turbofan engine, the invention is implemented by attaching the stream director as shown in the above figures. For a mixed-flow turbo fan engine, modification may be performed as follows. If a thrust reverser exists, it is removed. Then, the internal mixer is removed. If necessary, the bypass duct is shortened or the core duct is lengthened so that the exit plane of the bypass duct is co-planar, moderately extended, or recessed relative to the exit of the core duct 260. The cross section of the resulting bypass nozzle 252 is then reconfigured to achieve optimal thermodynamic performance. Then, the stream director 276 is installed as shown in the above figures. Finally, the thrust reverser is re-installed, if applicable. The thrust reverser may be configured such that it reverses the combination of the bypass and core streams or the bypass stream alone.

In applications where the vanes are also used for exit area control, the bypass duct and/or the core duct may be designed to produce substantially shock-free flow. The appropriate duct, either bypass duct or core duct, is convergent-divergent when the stream director is not deployed or activated. The area ratio is $A_e/A_i>1$, where $A_e$ is the exit area when the stream director is stowed, and $A_i$ is the inlet area which in the case acts as a throat area. The area ratio $A_e/A_i$ is selected such that the exit flow is pressure matched, and thus substantially shock-free, at cruise or climb conditions. On take-off, deployment or activation of the stream director reduces the exit area to $A'_e<A_e$, and therefore reduces the exit-to-throat area to $A'_e/A_i<A_e/A_i$. The value of $A'_e/A_i$ is selected to produce an exit flow that is pressure matched with the ambient at take-off, hence is substantially shock-free. This strategy allows substantially shock-free exit flow, hence reducing shock-induced noise, for the entire flight of the aircraft.

The nozzle cross sectional shapes for the above noise suppressor may be circular, elliptical, or any arbitrary cross section. The core nozzle may be placed centered or offset in any direction with respect to bypass nozzle.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A turbofan jet engine comprising:
   a first exhaust duct to exhaust a first stream through a first exit end from an air stream taken from an inlet, the air stream being divided into the first stream and a second stream, one of the first and second streams being a fan bypass stream;
   a second exhaust duct to exhaust the second stream through a second exit end, the first and second streams being substantially coaxial at the first and second exit ends; and
   a noise-reducing stream director attached to a vicinity of at least one of the first and second exit ends to directly deflect the first stream to a direction that is away from and/or sideward relative to the second stream such that the first stream is eccentric relative to the second stream downstream of the first and second exit ends to perform a directional noise reduction.

2. The jet engine of claim 1 wherein the stream director comprises at least one of a vane, a strake, and a fluid injector.

3. The jet engine of claim 2 further comprising:
   an actuator coupled to the at least one of the vane and the strake to control positioning the at least one of the vane and the strake in one of a retracted position and an extended position, the extended position directing the first stream to the direction that is away from or sideward relative to the second stream.

4. The jet engine of claim 3 wherein the retracted position corresponds to an alignment with respect to the first stream when noise reduction is not desired.

5. The jet engine or claim 3 wherein the extended position corresponds to a deflection with respect to the first stream when noise reduction is desired.

6. The jet engine of claim 3 wherein the retracted position corresponds to the stream director being stowed on one of the first and second exhaust ducts when noise reduction is not desired.

7. The jet engine of claim 3 wherein the extended position corresponds to an outward deployment in an azimuthal motion when noise reduction is desired.

8. The jet engine of claim 2 further comprising:
an actuator coupled to the at least one fluid injector to control injecting a fluid at an angle to the first stream, the injected fluid directing the first stream to the direction that is away from or sideward relative to the second stream.

9. The jet engine of claim 8 wherein the fluid is one of a compressed gas and a liquid.

10. The jet engine of claim 1 further comprising:
an actuator coupled to the stream director to activate the stream director, the activated stream director directing the first stream.

11. The jet engine of claim 10 wherein one of the first and second exhaust ducts has an inlet area and a first exit area at one of the first and second exit ends such that a first area ratio between the first exit area and the inlet area is greater than unity when the stream director is deactivated.

12. The jet engine of claim 11 wherein one of the first and second exhaust ducts has a second exit area at one of the first and second exit ends such that the second area ratio between the second exit area and the inlet area is less than the first area ratio when the stream director is activated.

13. The jet engine of claim 12 wherein at least one of the first and second area ratios is selected to produce an exit flow that is pressured matched with ambient flow.

14. The jet engine of claim 1 wherein the first exhaust duct is a core duet and the second exhaust duct is a bypass duet exhausting a bypass stream.

15. The jet engine of claim 14 wherein the stream director directs the first stream upward or sideward relative to the bypass stream.

16. The jet engine of claim 13 wherein the stream director causes formation of a substantially unmixed bypass flow from the bypass stream below the first stream.

17. The jet engine of claim 1 wherein the first exhaust duct is a bypass duct and the second exhaust duct is a core duct exhausting a core stream.

18. The jet engine of claim 17 wherein the stream director directs the first stream downward or sideward relative to the core stream.

19. The jet engine of claim 18 wherein the stream director causes formation of a substantially unmixed bypass flow from the first stream below the core stream.

20. The jet engine of claim 1 wherein the stream director is attached to an engine pylon.

21. The jet engine of claim 1 wherein the stream director is located within the first exhaust duct or the second exhaust duct.

22. A turbofan jet engine comprising an engine inlet, a core duct, and a fan bypass duct, wherein the engine inlet receives an air stream and a first portion of the air stream exhausts through the core duct at a core exit end and a second portion of the air stream exhausts through the bypass duct at a bypass exit end, the first and second portions being substantially coaxial at the core and bypass exit ends; and a noise-reducing stream director that directly deflects at least one of the first portion and the second portion to flow in directions that are away from and/or sideward relative to each other such that the first portion is eccentric relative to. the second portion downstream of the core and bypass exit ends to perform a directional noise reduction.

23. The jet engine of claim 22 wherein the stream director comprises at least one of a vane, strake, and fluid injector.

24. The jet engine of claim 22, further comprising an actuator to actuate the stream director.

25. The jet engine of claim 24, wherein the actuator actuates the stream director to a first position for noise suppression, and actuates the stream director to a second position for no noise suppression.

26. The jet engine of claim 25, wherein the stream director causes the first air stream and the second air stream to flow in direction away from and/or sideward relative to each other when it is in the first position.

27. The jet engine of claim 25, wherein the stream director causes formation of a substantially unmixed bypass flow from the first portion below the second portion.

28. The jet engine of claim 25, wherein the stream director causes formation of a substantially unmixed bypass flow from the second portion below the first portion.

29. The jet engine of claim 22 wherein the stream director is located on a core shroud or within the core duct or the bypass duct.

30. A turbofan jet engine comprising an engine inlet, a core duct, and a fan bypass duct, wherein the engine inlet receives an air stream and a first portion of the air stream exhausts through the core duct at a core exit end and a second portion of the air stream exhausts through the bypass duct at a bypass exit end, the first and second portions being substantially coaxial at the core and bypass exit ends; and a noise-reducing stream director attached to an engine pylon to directly deflect the second portion to flow in directions that are away from and/or sideward relative to the first portion such that the first portion is eccentric relative to the second portion downstream of the core and bypass exit ends to perform a directional noise reduction.

31. The jet engine of claim 30 wherein the stream director comprises at least one of a vane, a strake, and a fluid injector.

32. A turbofan jet engine comprising an engine inlet, a core duct having a shroud, and a fan bypass duct, wherein the engine inlet receives an air stream and a first portion of the air stream exhausts through the core duct at a core exit end and a second portion of the air stream exhausts through the bypass duct at a bypass exit end, the first and second portions being substantially coaxial at the core and bypass exit ends; and a noise-reducing stream director located within the bypass duct or the core duct or mounted on the shroud, the stream director causing the first portion and the second portion to flow in directions that are away from and/or sideward relative to each other such that the first portion is eccentric relative to the second portion downstream of the core and bypass exit ends to perform a directional noise reduction.

33. The jet engine of claim 32 wherein the stream director comprises at least one of a vane, a strake, and a fluid injector.

34. A turbofan jet engine comprising an engine inlet, a core duct having a shroud and a fan bypass duct, wherein the engine inlet receives an air stream and a first portion of the air stream exhausts through the core duct at a core exit end and a second portion of the air stream exhausts through the bypass duct at a bypass exit end, the First and second portions being substantially coaxial and parallel at the core and bypass exit ends; and a noise-reducing stream director located within the bypass duct or the core duct or mounted on the shroud, the stream director causing the first portion and the second portion to flow in directions that are away from and/or sideward relative to each other such that the First portion is eccentric relative to the second portion downstream of the core and bypass exit ends to perform a directional noise reduction.

35. The jet engine of claim 34 wherein the stream director comprises at least one of a vane, a strake, and a fluid injector.

* * * * *